F. A. TEMM.
AUTOMOBILE TOP ATTACHMENT.
APPLICATION FILED MAY 15, 1914.
1,130,348.
Patented Mar. 2, 1915.
*Fig. 1.*
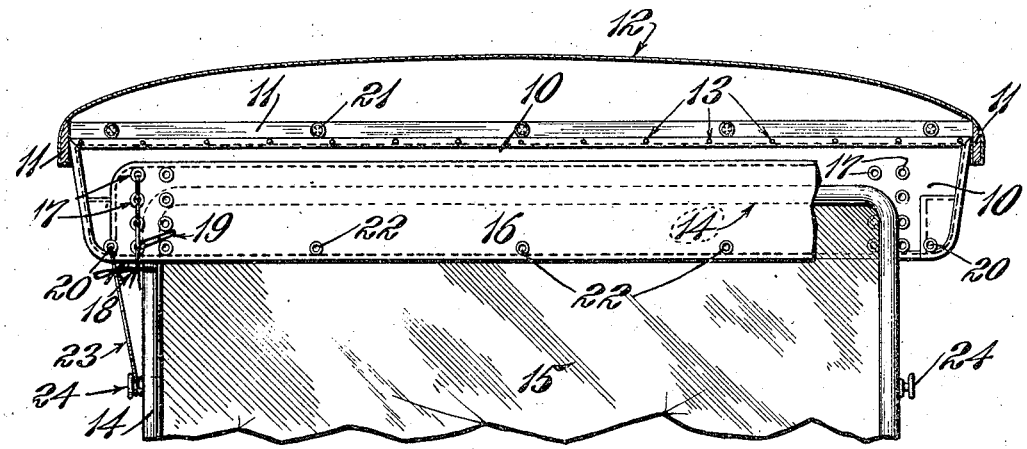
*Fig. 2.*
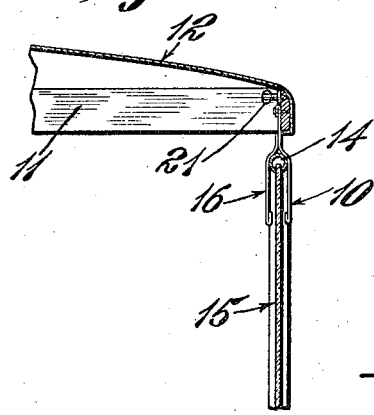
*Fig. 3.*
*Fig. 4.*
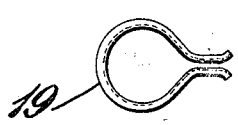
Witnesses:
Edgar T. Farmer
A. M. Holcombe
Inventor:
Francis A. Temm,
by Cavett Cavett,
his Attys.

UNITED STATES PATENT OFFICE.

FRANCIS A. TEMM, OF ST. LOUIS, MISSOURI.

AUTOMOBILE TOP ATTACHMENT.

1,130,348.   Specification of Letters Patent.   Patented Mar. 2, 1915.

Application filed May 15, 1914. Serial No. 838,632.

*To all whom it may concern:*

Be it known that I, FRANCIS A. TEMM, a citizen of the United States, and resident of the city of St. Louis and State of Missouri, have invented a new and useful Improvement in Automobile Top Attachments, of which the following is a specification.

This invention relates to attachments for automobiles for protecting the occupants from wind, rain, dust and the like, and especially to attachments which are carried by an automobile top.

The object of the invention is an attachment for automobile tops which is adjustable to coöperate with the standing wind shield with which most automobiles are equipped, to keep wind and rain from entering the front of the vehicle over the wind shield and below the front edge of the top.

The invention consists in a flap secured along one edge to the front bow of an automobile top and provided with a pocket along its free edge to embrace the top rim of a wind shield which sticks up on the front part of the automobile.

Further details of the invention appear in connection with the following description of the embodiment thereof shown in the accompanying drawings.

In the drawings, in which the same characters designate the same parts in the several views, Figure 1 is a vertical cross section through an automobile top looking forward, and showing the top portion of the wind shield and the invention applied thereto in elevation, the pocket being broken away at one end to uncover the corner of the wind shield; Fig. 2 is a central longitudinal vertical section of the portion of the automobile top and wind shield shown in Fig. 1, with the invention applied thereto. Fig. 3 is a detail view of one corner of the flap and parts associated therewith to a larger scale; and Fig. 4 is a view of the clip used for fastening the flap down around the top rim of the wind shield.

Referring to the drawings, the attachment comprises a flap 10 of flexible material which is applied to the front bow 11 of an automobile top 12 by means of tacks 13 along one edge. Instead of tacks, snap buttons or other releasable fastening means may be used for securing the edge of the flap to the bow 11, whereby it may be detached if desired. The free edge of the flap hangs below the top rim 14 of the wind shield 15, and a narrow strip 16, which extends nearly the full length of the flap, is sewed to the flap above the top rim of the wind shield to form a pocket which opens downward. The lower edge of the strip 16 is alongside of the lower edge of the flap, and at each end of the pocket the strip is stitched to the flap by a vertical line of stitching. The pocket is made long enough to accommodate the widest wind shield commonly fitted to automobiles. Spaced inwardly from the ends of the pocket are rows of eyelets 17 in the strip 16 parallel to the lines of stitching of the ends of the pocket. The flap also has eyelets in it opposite to the eyelets in the strip. In case the wind shield is not as wide as the pocket, a cord 18 is laced through the eyelets nearest each end of the wind shield to hold the strip and flap together to snugly embrace the top corners of the wind shield. The frictional engagement between the wind shield and walls of the pocket will keep them together under ordinary conditions. In order the more surely to prevent the pocket from working up and off from the top rim of the wind shield, spring clips 19 may be snapped through a convenient eyelet and around the rim 14 of the wind shield. An extra eyelet 20 is placed near the lower edge of the flap at the line of stitching at each end of the pocket. For securing the flap to a wide wind shield, the clips may be snapped through the eyelets 20. Elastic cords 23 passing through the eyelets 20 and secured to fixed parts 24 of the wind shield may be substituted for the spring clips 19, where the edge of the flap is very near the top rim of the wind shield or the relative vertical movement of the wind shield and top due to vibration of the vehicle is considerable. Buttons or hooks 21 are arranged along the front bow 11 of the top for fastening up the free edge of the flap, which is fitted with eyelets 22 for the purpose. The pocket can be readily freed from the rim of the wind shield without removing the clips from the eyelets, and flap and clips buttoned up into the top. The flap folds up with the top and takes up very little room when the top is folded back out of use.

It is evident that modification may be made in the details of construction and in the arrangement of the several parts of the device without departing from the invention;

and the invention is not restricted to the details of the construction and arrangement shown in the drawing.

What I claim as my invention is:

1. An automobile having a top and a movable wind shield adapted to be positioned with its upper rim below the front of said top, a narrow flap of flexible material permanently secured along one edge across the front of said top with its free edge suspended therefrom and depending below said rim, said flap having a marginal pocket along its free edge into which said rim projects in its raised position.

2. An automobile having a top and a movable wind shield adapted to be positioned with its upper rim below the front of said top, a narrow flap of flexible material permanently secured along one edge across the front of said top with its free edge suspended therefrom and depending below said rim, said flap having a marginal pocket along its free edge into which said rim projects in its raised position, and means for releasably securing said rim in said pocket whereby said wind shield can be moved without readjusting said flap.

3. An attachment for automobile tops comprising a flap adapted to be secured across the front of an automobile top with its free edge depending below the top rim of the wind shield of the automobile, said flap having a marginal pocket along its free edge, said pocket opening downward and being adapted to receive the top of the wind shield, rows of alining eyelets in said pocket parallel to its ends and spaced inwardly therefrom, each of said rows being adapted to receive a lacing whereby said attachment may be applied to wind shields of various widths.

4. An attachment for automobile tops comprising a flap adapted to be secured across the front of an automobile top with its free edge depending below the top rim of the wind shield of the automobile, said flap having a marginal pocket along its free edge, said pocket opening downward and being adapted to receive the top rim of the wind shield, rows of alining eyelets in said pocket parallel to its ends and spaced inwardly therefrom, each of said rows being adapted to receive a lacing whereby said attachment may be applied to wind shields of various widths, and a clip adapted to be snapped through alining eyelets in said pocket adjacent to the rim of said wind shield to embrace the latter and retain it in said pocket.

Signed at St. Louis, Missouri, this 12th day of May, 1914.

FRANCIS A. TEMM.

Witnesses:
AMASA M. HOLCOMB,
MARTHA A. SHELTON.